United States Patent
Henriquez et al.

(10) Patent No.: US 8,935,402 B2
(45) Date of Patent: Jan. 13, 2015

(54) RESOURCE LAUNCH FROM APPLICATION WITHIN APPLICATION CONTAINER

(75) Inventors: Alberto Henriquez, Bothell, WA (US); Kevin S. London, Monroe, WA (US); Travis M. Howe, Bellevue, WA (US); Raymond M. Reskusich, Seattle, WA (US); Debaprajna Bhattacharyya, Redmond, WA (US); James Henry Baker, III, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 413 days.

(21) Appl. No.: 13/315,263

(22) Filed: Dec. 8, 2011

(65) Prior Publication Data

US 2013/0151706 A1 Jun. 13, 2013

(51) Int. Cl.
*G06F 15/16* (2006.01)

(52) U.S. Cl.
USPC ........... 709/226; 709/227; 709/228; 709/229; 709/230

(58) Field of Classification Search
CPC ............................ G06F 11/3409; G06F 9/5027
See application file for complete search history.

(56) References Cited

U.S. PATENT DOCUMENTS

| | | | |
|---|---|---|---|
| 7,779,091 B2 | 8/2010 | Wilkinson et al. | |
| 7,984,483 B2 | 7/2011 | Leitz et al. | |
| 2001/0034771 A1* | 10/2001 | Hutsch et al. | 709/217 |
| 2004/0030741 A1* | 2/2004 | Wolton et al. | 709/202 |
| 2005/0257204 A1* | 11/2005 | Bryant et al. | 717/163 |
| 2008/0034071 A1 | 2/2008 | Wilkinson et al. | |
| 2008/0288889 A1* | 11/2008 | Hunt et al. | 715/810 |
| 2008/0306959 A1* | 12/2008 | Spivack et al. | 707/9 |
| 2009/0222531 A1 | 9/2009 | London et al. | |
| 2009/0249335 A1 | 10/2009 | Vasilevsky et al. | |
| 2009/0327905 A1 | 12/2009 | Mascarenhas et al. | |

OTHER PUBLICATIONS

"Introducing RemoteApp and Desktop Connections", Retrieved on: Aug. 25, 2011, Available at: http://blogs.msdn.com/b/rds/archive/2009/06/08/introducing-remoteapp-and-desktop-connections.aspx.
"Centrix Software—Application Discovery for Cloud Computing", Retrieved on: Aug. 26, 2011, Available at: http://martinhingley.wordpress.com/2011/04/05/centrix-software-q111/.

* cited by examiner

*Primary Examiner* — Djenane Bayard
(74) *Attorney, Agent, or Firm* — Kate Drakos; David Andrews; Micky Minhas

(57) ABSTRACT

A remote resource application that is associated with an application container in a manner that the application container restricts the remote resource application from directly accessing at least a file system of the computing system. The remote resource application provides a visualization for each of multiple remote resources. The user may launch the remote resource by selecting the corresponding visualization. Some of the remote resources are accessed by launching from the remote resource application itself in the context of the application container. Others of the remote resources are launched outside of the application container. The remote desktop application may operate securely within the application container, and still serve as an integrated location from which a user can access remote resources, regardless of whether the remote resource is launched from internal or external to the application container.

19 Claims, 6 Drawing Sheets

RESOURCE LAUNCH FROM APPLICATION WITHIN APPLICATION CONTAINER

BACKGROUND

Computing systems often may launch remote resources whereby the computing system is able to access remote resources. For instance, the computing system may launch a remote application. In this manner, the computing system is not limited to functionality and information offered by local resources or applications.

In one conventional solution, the user subscribes to an XML feed that for each of multiple remote resources includes information as to 1) a name of the remote resource, 2) an icon or other visualization for the remote resource, and 3) a resource file that contains instructions on how to launch the remote resource such that the remote resource may be accessed by the client.

Accordingly, the XML feed provides the information for each of the multiple remote resources in the file system of the client. The client may then use the information to provide an appropriate visualization of the remote resource to the user, and allow the user to launch the remote resource once selected.

BRIEF SUMMARY

At least one embodiment described herein relates to a remote resource application that is associated with an application container in a manner that the application container restricts the remote resource application from directly accessing at least a file system of the computing system. The remote resource application provides a visualization for each of multiple remote resources. The user may launch the remote resource by selecting the corresponding visualization.

Some of the remote resources are accessed by launching from the remote resource application itself in the context of the application container. Others of the remote resources are launched outside of the application container. For instance, launching may consist of accessing and interpreting a resource file that contains instructions on how to access the remote resource, and causing such instructions to be followed. Thus, the remote desktop application may operate within the application container, and still serve as an integrated location from which a user can access remote resources, regardless of whether the remote resource is launched from internal or external to the application container.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore considered to be limiting of the scope of the invention, the embodiments will be described and explained with additional specificity and detail through the use of the accompanying drawings in which.

DETAILED DESCRIPTION

In accordance with embodiments described herein, a remote resource application is associated with an application container in a manner that the application container restricts the remote resource application from directly accessing at least a file system of the computing system. The remote resource application provides a visualization for each of multiple remote resources that a user may select to launch the remote resource. Some of the remote resources are accessed by launching from the remote resource application itself in the context of the application container. Others of the remote resources are launched outside of the application container. First, some introductory discussion regarding computing systems will be described with respect to FIG. 1. Then, the embodiments of the remote resource application, its environment, and their operation will be described with respect to FIGS. 2 through 6.

Figure 1:
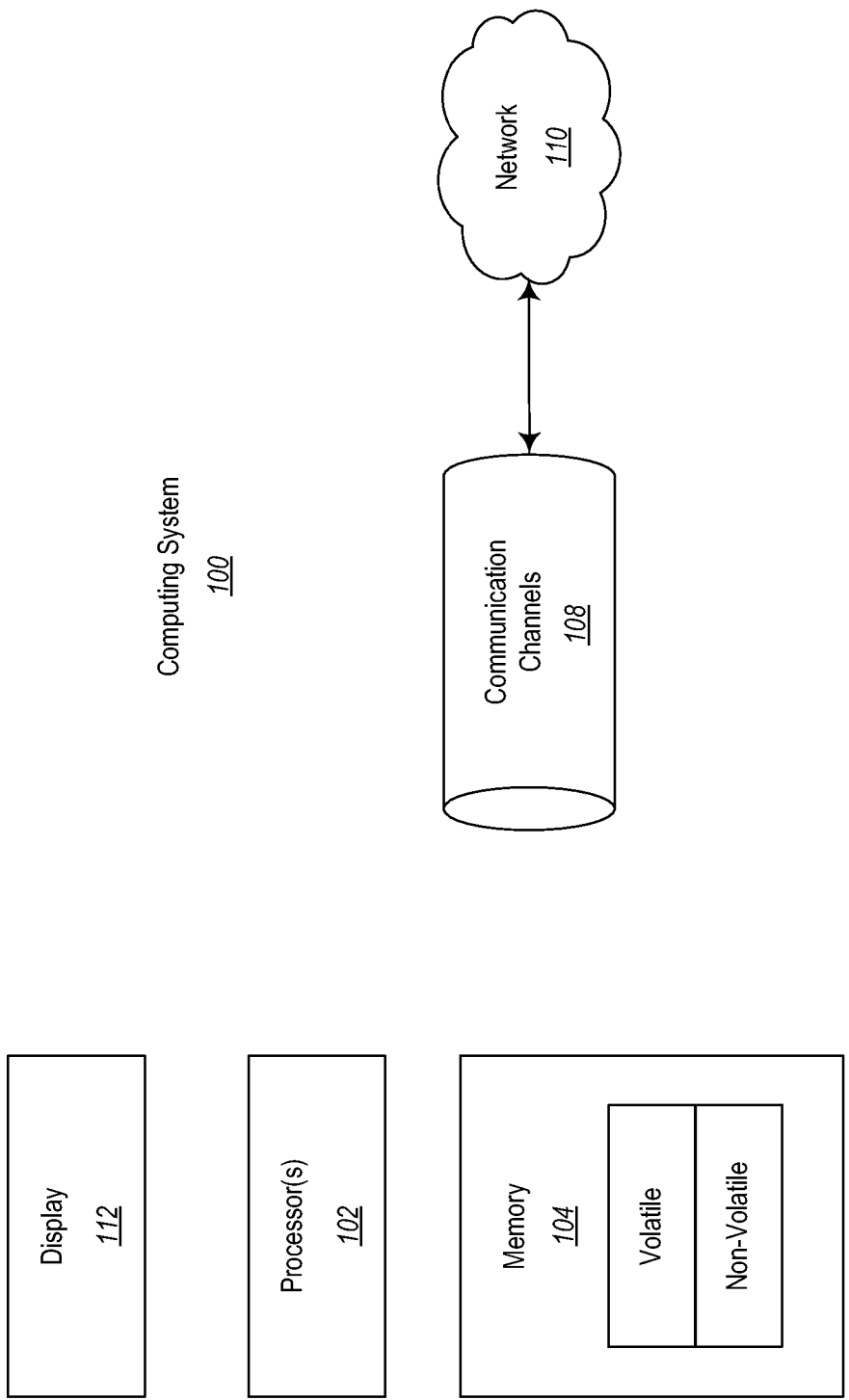
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system may also include a display 112 that may display one or more user interfaces that a user of the computing system may interface with.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. In this description and in the claims, a "computer program product" includes one or more computer storage media having computer-executable instructions thereon that, when executed by the one or more processors of the computing system, perform the function of the computer program product.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
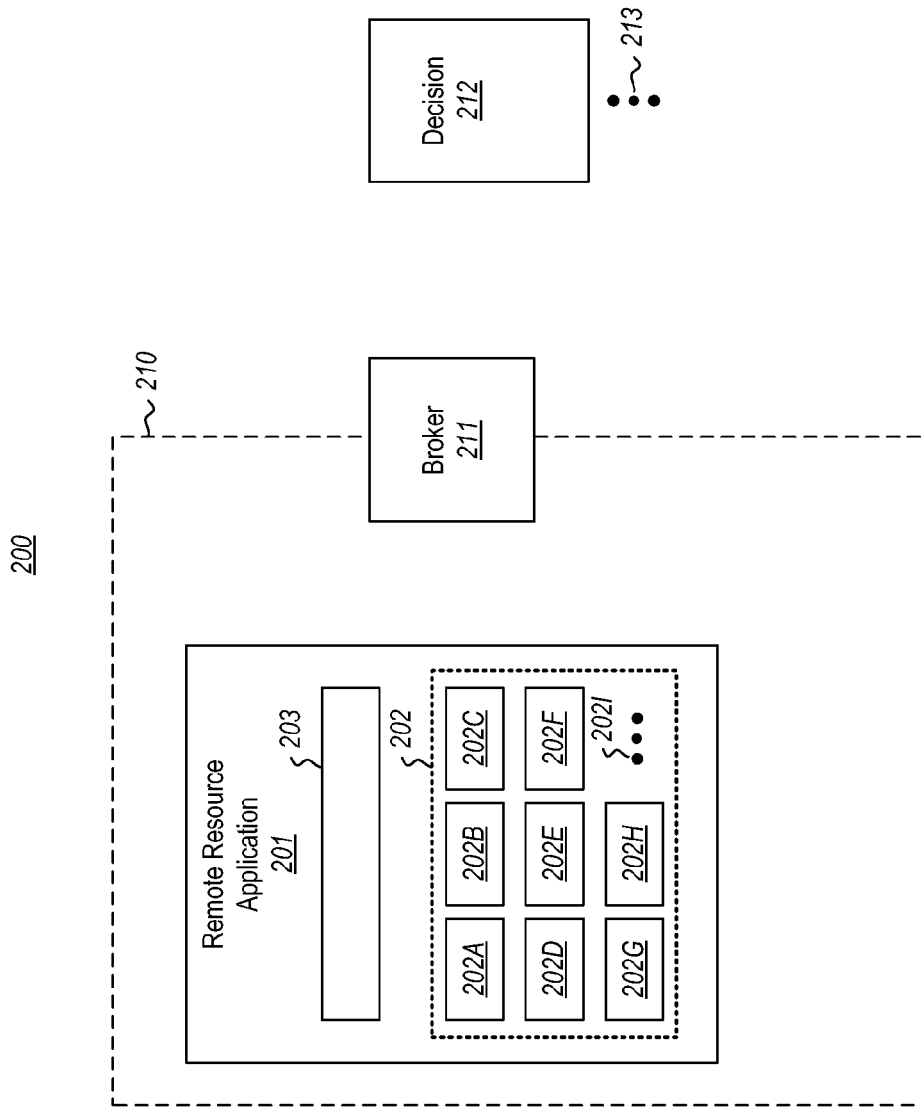
FIG. 2 illustrates an environment that includes a remote resource application that is contained by an application container.

FIG. 2 illustrates an environment 200 that includes a remote resource application 201 that is restrictively associated with an application container 210. In this description and in the claims, an application is "restrictively associated" with the application container 210 if the application container 210 restricts the application from performing at least some activity. In FIG. 2, any such restrictively associated applications are shown as being contained within the application container 210. In FIG. 2, there is just one restrictively associated application (i.e., the remote resource application 201) that is illustrated as being contained within the application container 210. However, the principles described herein are not limited to that case, as there may also be one or more other applications (not shown) associated with the application container 210.

As an example, the application container 210 may restrict the remote resource application 201 from accessing a file system of the computing system, or perhaps from accessing system configuration memory locations, such as a registry. The application container 210 might also prohibit the resource application 201 from performing redirect operations, or perhaps reading from or writing to a network. The authoring model in which certain applications may be selected to act within an application container is a helpful tool to design security into the overall computing system.

In order to perform certain actions that are directly prohibited by the application container 210, the contained application instead requests such actions to be performed indirectly via a broker component. For instance, in FIG. 2, the broker component 211 intermediates between the remote resource application 201 and certain system resources outside of the application container 210 (such as the file system, system configuration memory locations, and so forth).

A decision component 212 (and other components as represented by the ellipses 213) resides outside of the application container 210 and it thus has fewer (and perhaps no) restrictions on accessing system resources. The decision component 212 assists in deciding whether to launch remote resources internal to or external to the application container 210.

In one example embodiment, one or more of the remote resource application 201, the application container 210, the broker component 211 and the decision component 212 may be instantiated in a memory (such as memory 104 of FIG. 1) of a computing system (such as computing system 100 of FIG. 1) in response to the processor(s) (e.g., processor(s) 102) executing one or more computer-executable instructions that are on a computer-readable media that are at least part of a computer program product accessed by the computing system. Alternatively or in addition, one or more of the remote resource application 201, the application container 210, the broker component 211 and the decision component 212 may be operated by the computing system in accordance with one or more embodiments described herein in response to the computing system executing the computer-executable instructions. Further regarding example operations of each of the remote resource application 201, the application component 210, the broker component 211 and the decision component 212 will be described in further detail hereinafter.

The remote resource application 201 represents a centralized location from which the user may initiate launch of any of multiple remote resources represented in FIG. 2 as remote resources 202. While the remote resources themselves are not present in the remote resource application 201, the user may access data from the remote resources via the remote resource application 201. Furthermore, the remote resource application 201 may be used to launch the corresponding remote resource.

In some embodiments, some of remote resources 202 are launched from internal to the application container 210 (and perhaps by the remote resource application 201 itself), and some of the remote resources 202 are launched from external to the application container 210. In the illustrated embodiment, eight remote resources 202A through 202H are illustrated, although the ellipses 2021 symbolically represents that there may be any number of remote resources accessible from the remote resource application 201, and that the precise number is not important to the broader principles described herein.

In this description and in the claims, a "remote resource" with respect to a client computing system is a software component that executes on a remote computing system other than the client computing system, but nonetheless is capable of, with preliminary communication between the client and remote computing systems, performing cooperative execution of the remote resource. In this description and in the claims a client and remote computing system perform "cooperative execution" of the remote resource if the remote resource receives user input instructions from the client computing system to thereby affect execution of the remote resource, and the remote resource provides graphical instructions to the client computing system to thereby render a user interface for the remote resource on the client computing system. In this description and in the claims, "launching" a remote resource means performing the preliminary communication that enables this cooperative execution to occur between the client computing system and the remote resource running on the remote computing system.

In this description and in the claims, launching a remote resource "from internal to the application container" means that executable logic (perhaps the remote resource application itself) that is contained by the application container follows the launch instructions to cause the remote resource to be accessed by the user. Launching a remote resource "from external to the application container" means that executable logic not contained by the application container follows the launch instructions to cause the remote resource to be accessed by the user.

As previously mentioned, the remote resource application represents an integrated location in which the user may initiate launch of any one of multiple remote resources. Accordingly, the remote resource application 201 is abstractly illustrated as including a user interface 203. The user interface 203 has controls in the form of visualizations that the user may select to launch the corresponding remote resources 202.

Figure 3:
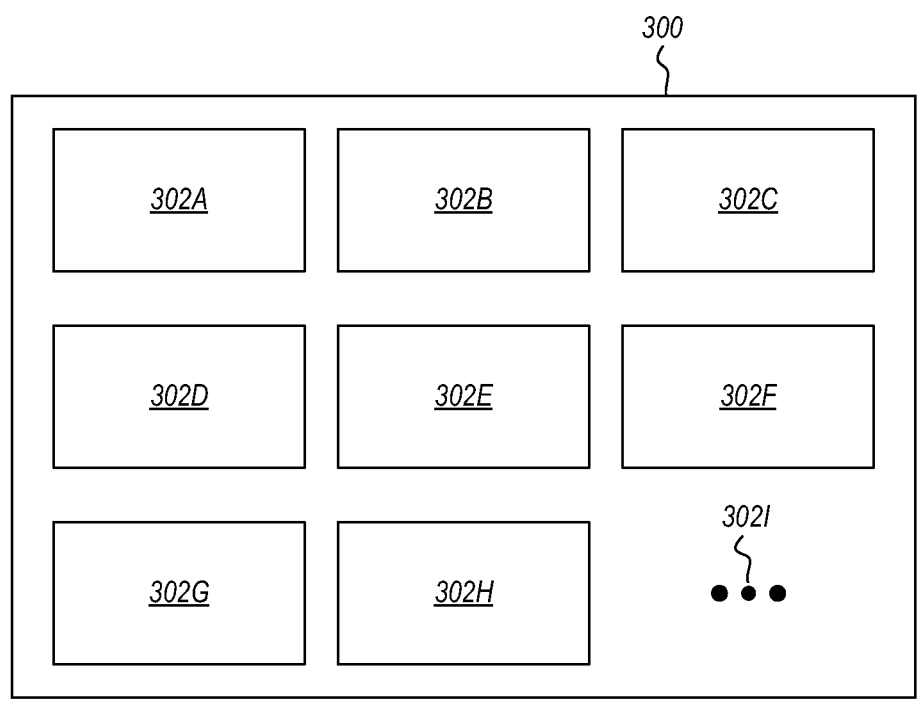
FIG. 3 abstractly illustrates a user interface in which a visualization is presented for each of multiple remote resources that may be launched by the user.

As an example only, FIG. 3 abstractly illustrates a user interface 300 in which a visualization is presented for each of multiple remote resources. For instance in FIG. 3, there are eight visualizations 302A through 302H. These visualizations 301A through 301H may each correspond to remote resources 202A through 202H, respectively. Once again, the ellipses 3021 symbolically represents that there may be any number of remote resources accessible from the remote resource application 201, and that the precise number is not important to the broader principles described herein. The user may initiate launch of the corresponding remote resource by selecting the corresponding visualization.

Some of the remote resources may be accessed by launching from internal to the application container. For instance, referring to FIG. 2, some of the remote applications may be launched from internal to the application container 210, perhaps by the remote resource application 201 itself. In an example called herein the "application example", suppose that remote resources 202A and 202E (corresponding to visualizations 302A and 302E) may be launched directly from internal to the application container 210, perhaps by the remote resource application itself.

On the other hand, some of the remote resources are accessed by launching from external to the application container. For instance, referring to FIG. 2, some of the remote applications may be launched from external to the application container 210, perhaps by the decision component 212 and/or some other external component 213. In the application example, suppose that remote resources 202B through 202D and 202F through 202H (corresponding to visualizations 302B through 302D and 302F through 302H) are launched from external to the application container 210.

Figure 4:
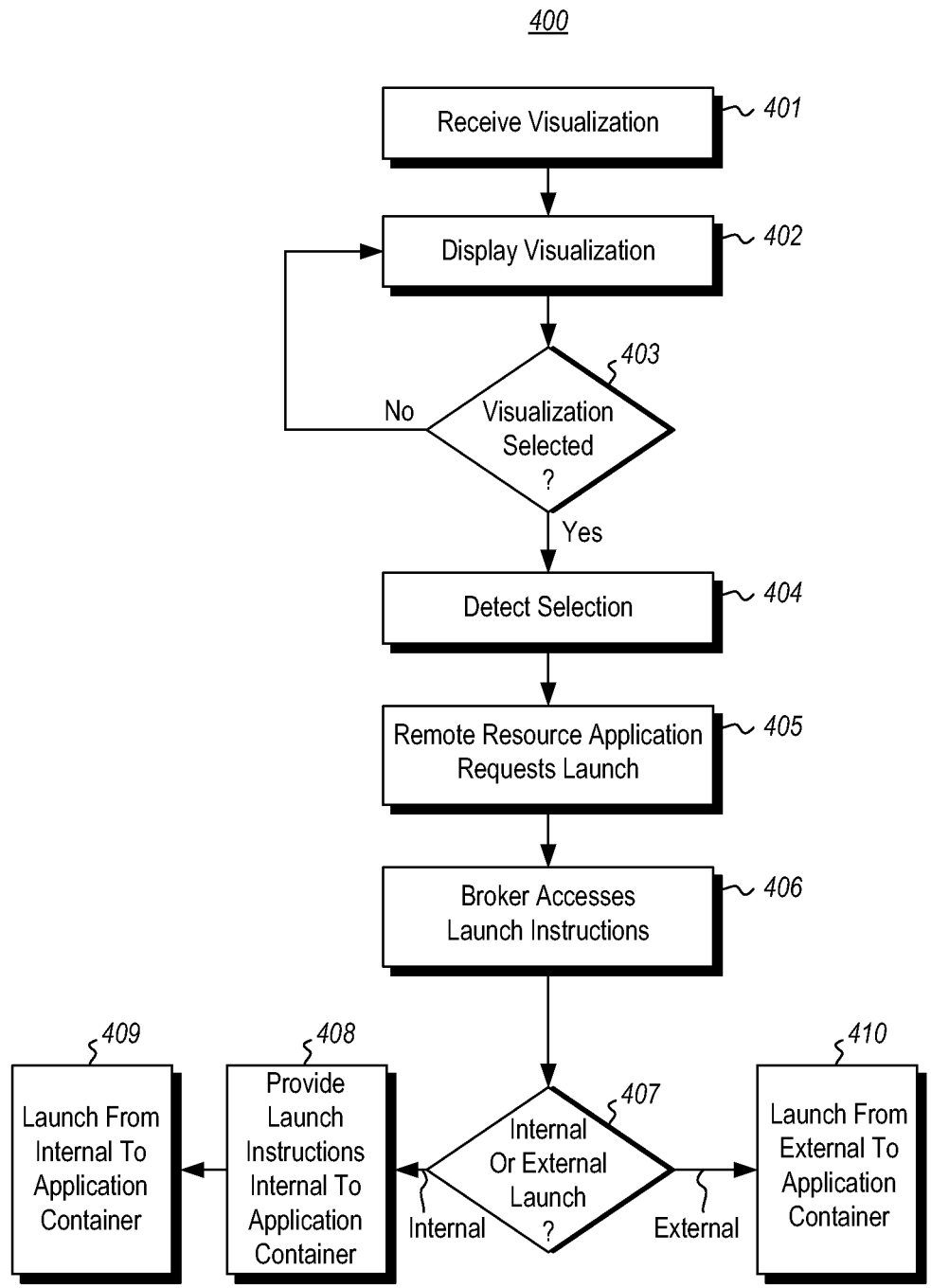
FIG. 4 illustrates a flowchart of a method for a computing system to operate a remote resource application that is contained within an application container.
Figure 5:
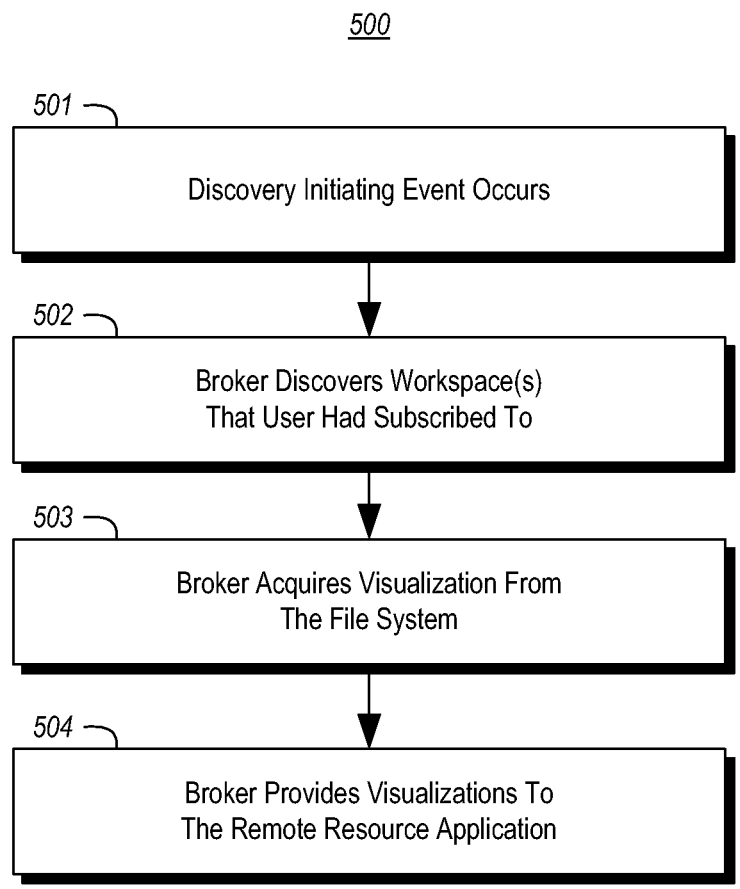
FIG. 5 illustrates a flowchart of a method for discovering one or more workspaces to which the user has previously subscribed or been subscribed.

FIG. 4 illustrates a flowchart of a method 400 for a computing system to operate a remote resource application that is contained within an application container. The method 400 presupposes the existence of visualizations presented by a remote resource application, such as the remote resource application 201 of FIG. 2. FIG. 5 illustrates a flowchart of a method 500 for the remote resource application 201 to access the visualizations of available remote resources. Nevertheless, FIG. 4 will be first described.

As an example, the method 400 may be performed in the context of the environment 200 of FIG. 2, in which the computing system operates the remote resource application 201. The method 400 of FIG. 4 will thus now be described with frequent reference to the environment 200 of FIG. 2, and the user interface 300 of FIG. 3.

The remote resource application receives the visualizations from a broker component that intermediates between the remote resource application and the system environment external to the application container (act 401). In the context of FIGS. 2 and 3, the remote resource application may be remote resource application 201, the visualizations may be visualizations 302 of FIG. 3, the broker component may be broker component 211, and the application component may be application component 210. As an example, the visualizations might be images, but the visualizations might also include dynamic content. FIG. 5 shows a flowchart of an example method 500 of discovering visualizations so that they can be provided back to the remote resource application, and will be later described. In one example, the visualizations existed in the file system of the computing system, and thus could not be directly accessed directly by the remote resource application.

The remote resource application then presents the visualizations for each of the remote resources to the user (act 402). For instance, FIG. 3 abstractly illustrates a user interface 300 in which visualizations 302 are presented to the user. FIG. 2 abstractly represents such a user interface 203. As an example, if the remote resource application 201 and the application container 210 are executed by the computing system 100 of FIG. 1, the user interface 203 may be rendered on the display 112.

The visualizations are selectable by the user to launch the corresponding remote resource. If the user does not select a visualization (No in decision block 403), then the visualizations simply remain presented to the user (act 402). However, if the user does select one of the visualizations (Yes in decision block 403), then the remote resource application 201 detects the selection (act 404).

The remote resource application 201 responds to the detected user selection of the visualization by requesting that the broker component 211 launch the remote resource visualized by the selected visualization (act 405).

The broker component (e.g., broker component) 211 accesses the launch instructions (act 406) in order to prepare for the launch. As an example only, the launch instructions may be in the form of a resource file such as, for example, an RDP file. In one example, the launch instructions may be located in the file system, and thus is not directly accessible by the remote resource application 201.

The broker then uses a decision component (e.g., decision component 212 of FIG. 2) to decide whether the corresponding remote resource is to be launched from internal to the application container or from external to the application container (decision block 407). Having a component external to the application container 210 make this decision reduces the chance that a malicious remote resource application 201 might attempt to improperly influence this decision. Alternatively, this decision may be performed by the remote resource application 201 in cases in which there is less concern that the remote resource application 201 would improperly decide where to launch the remote resource.

If it is determined that the corresponding remote resource is to be launched from internal to the application container ("Internal" in decision block 407), the resource file is provided back to internal to the application container (act 408) for launching from within the application container (act 409). Referring to FIG. 2 as an example, the launch instructions may be provided from the broker component 211 back to execution logic (e.g., the remote resource application 201 itself) internal to the application container 210.

On the other hand, if it is determined that the corresponding remote resource is to be launched from external to the application container ("External" in decision block 407), the remote resource is launched from external to the application container (act 410). As an example, the remote resource may be launched in the same manner as it would have been launched without the existence of the application container. For instance, if the application container concept was introduced in a particular operating system version, the remote resource may be launched in the same manner as it would have been in the immediately prior version of the operating system.

The decision of whether the corresponding remote resource is to be launched from internal to or external to the application container may be performed based on an evaluation of the launch instructions. For instance, suppose that the launch instructions were provided in a resource file such as an RDP resource file, the resource file may be inspected to determine whether the remote resource uses a desktop, uses a file system, performs a redirect, or other actions that are not consistent with a launch from internal to the application container. If, for example, the inspection verifies that the remote resource requires a desktop, that would be incompatible with execution without an application container if the application container does not have a concept of a desktop. In that case, the remote resource would be launched from external to the application container. If the inspection verifies that the remote resource uses direct access to the file system, that again would be incompatible with execution within an application container, and thus the remote resource would be launched from external to the application container.

FIG. 5 illustrates a flowchart of a method 500 for the broker component discovering one or more workspaces to which the user has previous subscribed or been subscribed. In this embodiment, each workspace corresponds to a portion of the remote resources that are to be made available to the remote resource application. The method 500 may be performed in order to populate the remote resource application with appropriate visualizations of the remote resources corresponding to the one or more workspaces.

The discovering is initiated upon the occurrence of a predetermined event (act 501). As an example, an event that might cause initiation of the discovery method 500 might be that the user subscribes to a new workspace. The process of subscribing to a new workspace will be described further below with respect to FIG. 6. Another event might be that the workspace has changed such that rerendering of the visualizations is appropriate. For instance, a name or visualization of a remote resource might have changed, or perhaps a remote resource has been added to or deleted from the workspace.

Upon detection that such an event has occurred (act 501) the broker component discovers the workspaces that are associated with the user (act 502). These workspaces would be workspaces that the user had previously subscribed to, or that the user had been subscribed to by other entities (e.g., a company that the user works for). As part of that subscription process (described further below), the file system had been populated with the workspace names, and the corresponding remote resource names, visualizations, and launch instructions. The broker component uses the identities of the workspaces to acquire the appropriate remote resource visualizations from the file system (act 503), and provide such visualizations to the remote resource application (act 504), so that the user interface (e.g., user interface 300) may be populated with the visualizations.

Figure 6:
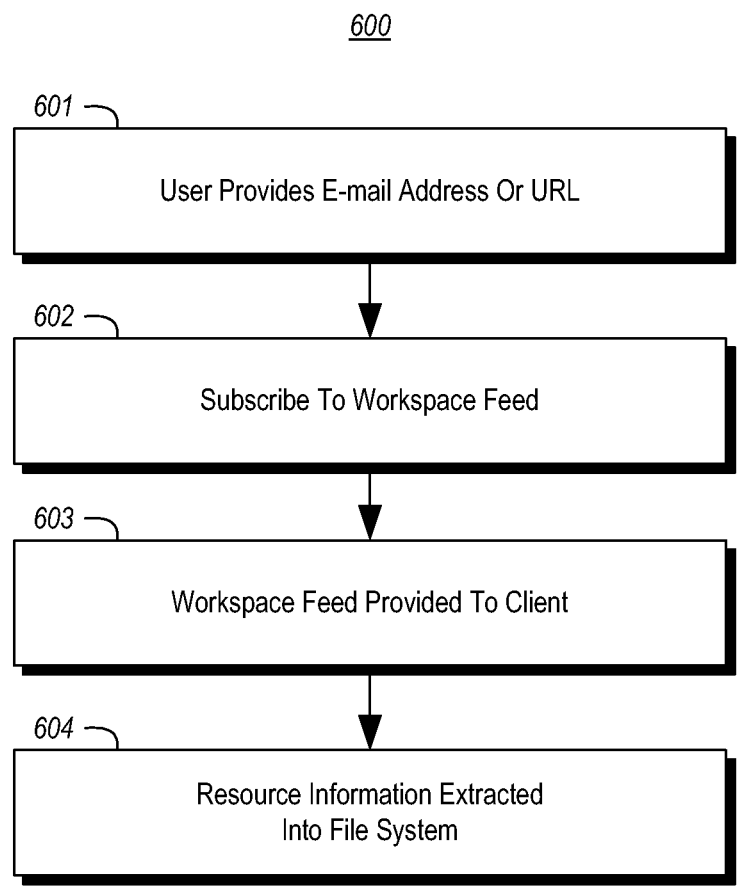
FIG. 6 illustrates a flowchart of a method for a user subscribing to a workspace and its constituent resources.

The method 500 of FIG. 5 presumes that the user has one or more resources that have been subscribed to by or on behalf of the user. FIG. 6 illustrates a flowchart of a method 600 for an entity subscribing to a workspace and its constituent resources. The user provides an e-mail address or a uniform resource identifier associated with the workspace to be subscribed to (act 601).

The broker component then receives the user-provided information, and subscribes to an identified workspace feed on behalf of a user (act 602). As an example, if the user provided an e-mail address to the remote resource application, the remote resource application provides the e-mail address to the broker component. The broker component communicates with a Domain Name Server (DNS) server to resolve the e-mail address to a Uniform Resource Locator (URL). Alternatively, the user provides the URL, and the remote resource application provides the URL to the broker component. Either way, the broker component acquires the URL corresponding to the workspace. The broker component and/or an external component operating outside of the application container then negotiates with the server corresponding to the URL, to thereby initiate setup of the workspace feed.

As a result, a workspace feed (e.g., an XML feed) is provided to the client computing system that the user operates upon (act 603), and the appropriate information (such as workspace name, resource name, resource visualization, and resource launch instructions) is then provided into the file system (act 604).

In one embodiment, the workspace feed in updated to reflect changes to the resource information. For instance, perhaps a resource name has changed, the visualization has changed, and/or the launch instructions have changed. Also, perhaps a new remote resource is added to the workspace, or a remote resource is deleted from the workspace. In that case, the broker component may monitor for such changes, and notify the remote resource application of the same after performing the discover method 500. From the user's perspective, the change is just automatically reflected in the user interface.

Accordingly, the principles described herein provide a mechanism whereby a remote resource application that operates within an application location may act as an integrated location that may present a way for a user to initiate launch of remote resources, regardless of whether such remote resources are to be launched from internal to or external to the application container The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-storage devices having thereon one or more computer-executable instructions that are structured such that, when executed by one or more processors of the computing system, cause the computing system to perform a computer-implemented method comprising:
    at a remote resource application located in an application container running on a computing system which has a file system or other system environment external to and restricted from access by the remote resource application in the application container, receiving from a broker component one or more visualizations for one or more remote resources;
    displaying the received visualizations at a user interface of the remote resource application;
    in response to selection of a visualization for a remote resource, the remote resource application requesting the broker component to access launch instructions for the remote resource corresponding to the selected visualization;
    determining at a decision component whether the remote resource corresponding to the selected visualization must be launched external to the application container or whether the remote resource corresponding to the selected visualization is able to be launched from the remote resource application inside the application container; and
    launching the remote resource corresponding to the selected visualization at the remote resource application.

2. The computer program product in accordance with claim 1, wherein the broker component intermediates between the remote resource application and the file system to thereby provide one or more visualizations from the file system to the remote resource application.

3. The computer program product in accordance with claim 2, wherein the one or more visualizations are provided in response to the broker component discovering one or more workspaces to which a user of the remote resource application has previously subscribed.

4. The computer program product in accordance with claim 3, wherein the discovering the one or more workspaces occurs in response to the user completing subscription to at least one of the one or more workspaces.

5. The computer program product in accordance with claim 3, wherein the discovering the one or more workplaces occurs in response to a change in the remote resources corresponding to at least one of the one or more workspaces.

6. The computer program product in accordance with claim 3, wherein the user initiates subscription to a workspace by providing an e-mail address.

7. The computer program product in accordance with claim 3, wherein the user initiates subscription to a workspace by providing a uniform resource locator.

8. The computer program product in accordance with claim 1, wherein the remote resource application is configured to detect when a user selects a visualization of a remote resource displayed in the user interface of the remote resource application.

9. The computer program product in accordance with claim 8, wherein the broker component intermediates between the remote resource application and the file system when requested to access launch instructions.

10. The computer program product in accordance with claim 1, wherein the decision component is external to the application container.

11. The computer program product in accordance with claim 1, wherein the decision component is internal to the application container.

12. A computer-implemented method comprising:
    at a remote resource application located in an application container running on a computing system which has a file system or other system environment external to and restricted from access by the remote resource application in the application container, receiving from a broker component one or more visualizations for one or more remote resources;
    displaying the received visualizations at a user interface of the remote resource application;
    in response to selection of a visualization for a remote resource, the remote resource application requesting the broker component to access launch instructions for the remote resource corresponding to the selected visualization;
    determining at a decision component that is either internal to the remote resource application or external to the remote resource application whether the remote resource corresponding to the selected visualization must be launched external to the application container or whether the remote resource corresponding to the selected visualization is able to be launched from the remote resource application inside the application container; and launching the remote resource corresponding to the selected visualization at the remote resource application.

13. The computer-implemented method in accordance with claim 12, wherein the broker component intermediates between the remote resource application and the file system to thereby provide the plurality of visualizations from the file system to the remote resource application.

14. The computer-implemented method in accordance with claim 13, wherein the one or more visualizations are provided in response to the broker component discovering one or more workspaces to which a user of the remote resource application has previously subscribed.

15. The computer-implemented method in accordance with claim 14, wherein the discovering the one or more workspaces occurs in response to the user completing subscription to at least one of the one or more workspaces.

16. The computer-implemented method in accordance with claim 14, wherein the discovering the one or more workplaces occurs in response to a change in the remote resources corresponding to at least one of the one or more workspaces.

17. The computer-implemented method in accordance with claim 14, wherein the user initiates subscription to a workspace by providing an e-mail address.

18. The computer-implemented method in accordance with claim 14, wherein the user initiates subscription to a workspace by providing a uniform resource locator.

19. A computer-implemented method comprising:

at a remote resource application located in an application container running on a computing system which has a file system or other system environment external to and restricted from access by the remote resource application in the application container, in response to a user of the remote resource application subscribing to one or more workspaces, receiving from a broker component one or more visualizations for one or more remote resources, at least some of the remote resources corresponding to the one or more workspaces;

displaying the received visualizations at a user interface of the remote resource application;

in response to selection of a visualization for a remote resource, the remote resource application requesting the broker component to access launch instructions for the remote resource corresponding to the selected visualization;

determining at a decision component that is either internal to the remote resource application or external to the remote resource application whether the remote resource corresponding to the selected visualization must be launched external to the application container or whether the remote resource corresponding to the selected visualization is able to be launched from the remote resource application inside the application container; and launching the remote resource corresponding to the selected visualization at the remote resource application.

wherein the plurality of visualizations were provided in response to a user of the remote resource application subscribing to one or more workspaces, each corresponding to at least a portion of the plurality of remote resources.

* * * * *